United States Patent [19]

Baile et al.

[11] Patent Number: 4,795,775
[45] Date of Patent: Jan. 3, 1989

[54] PRIMER COMPOSITIONS

[75] Inventors: Madhu Baile; Joseph T. Braun; Joseph N. Clark, all of Midland, Mich.

[73] Assignee: Dow Corning Corporation, Midland, Mich.

[21] Appl. No.: 160,459

[22] Filed: Feb. 25, 1988

[51] Int. Cl.$^4$ ................................................ C08K 5/05
[52] U.S. Cl. ................................... 524/379; 524/385; 524/391; 524/765
[58] Field of Search ................ 524/379, 385, 391, 765

[56] References Cited

U.S. PATENT DOCUMENTS 3,306,800  2/1967  Plueddemann ...................... 156/329
4,344,800  8/1982  Lutz ................................ 106/308 Q
4,719,262  1/1988  Plueddemann ...................... 525/105

Primary Examiner—Melvyn I. Marquis
Attorney, Agent, or Firm—Robert Spector

[57] ABSTRACT

Improved primer compositions comprise (A) at least one member of a specified group of ethylenically unsaturated organosilicon compounds containing silicon-bonded alkoxy groups, (B) silicone/organic copolymers prepared from esters of ethylenically unsaturated organic acids and organosilicon compounds derived from these acids, (C) organohydrogensiloxane curing agents and (D) a solvent. The improvement resides in the presence in the solvent of an ethylenically unsaturated alcohol containing from 4 to 6 carbon atoms. The alcohol constitutes at least 50 percent by weight of the solvent.

5 Claims, No Drawings

PRIMER COMPOSITIONS

BACKGROUND OF THE INVENTION

1. Field of the Invention

This invention relates to primer compositions. MOre particularly, this invention relates to primer compositions capable of achieving cohesive bonding between organosiloxane elastomers and organic polymers. The primers are particularly useful for preparing optically transparent laminates comprising layers of theroplastic organic polymers bonded by a cured organosiloxane elastomer. These laminates can be used as windows and windshields in vehicles and aircraft.

2. Description of the Prior Art

Organosilicon compounds useful for bonding organosiloxane elastomers to various substrates are disclosed in U.S. Pat. No. 4,719,262 issued to Edwin Plueddemann on January 12, 1988. The organosilicon compound is a silane or bissilylalkane containing at least two silicon-bonded alkoxy groups per molecule in addition to at least one substituent that is bonded to silicon through oxygen and contains at least four carbon atoms, two of which form a terminal group of the formula $CH_2=CH-$. A preferred group of these organosilicon compounds include reaction products of (1) an alkoxy-substituted disilylalkane such as 1,2-bis(trimethoxysilyl)ethane and (2) a monoether or diether derived from (a) an alkyl polyol such as ethylene or propylene glycol, glycerol or 1.1.1- trimethylolpropane and (b) an ethylenically unsaturated alcohol such as allyl alcohol.

If one of the substrates to be bonded is an amorphous, glassy organic polymer such as polystyrene or an ester of acrylic or methacrylic acid, in addition to at least one of the aforementioned organosilicon compounds the primer composition also contains (1) a silicone/organic copolymer derived from (a) at least one ethylenically unsaturated organic monomer such as styrene and esters of methacrylic acid or acrylic acid and (b) a silane containing three hydrolyzable groups bonded to silicon and one silicon bonded hydrocarbon or substituted hydrocarbon radical containing a terminal $CH_2=CH-$ radical, (2) an organohydrogensiloxane containing an average of at least three silicon bonded hydrogen atoms per molecule and (3) a solvent capable of dissolving all of the remaining ingredients in the composition.

Solvents for primer compositions comprising the mixtures of organosilicon compounds and silicon/organic copolymers disclosed in the aforementioned patent to Plueddemann include the methyl and ethyl ethers of either ethylene glycol or propylene glycol. A disadvantage of primer compositions containing these solvents is their inability to reproducibly form a thin, continuous, coherent and smooth film when applied by wiping. brushing or spraying to surfaces formed from the aforementioned amorphous, glassy organic polymers. In terms understood by those knowledgeable in surface chemistry, these compositions do not completely "wet" the surface of these polymers, resulting in unprimed areas or the presence of defects referred to as "orange peel" and "fish eyes". As a consequence of this difficulty in properly applying the primer to the substrate surface, one cannot reproducibly achieve the desired level of adhesion between the organosiloxane elastomer and the organic polymer substrates such that when force is applied to peel the elastomer layer from the substrate, separation occurs by a rupturing of the elastomer layer (cohesive failure) rather than along the interface between the elastomer and the substrate (adhesive failure).

While not wishing to be bound by any theory, the present inventors believe this inability of primer compositions containing the silicone/organic copolymers disclosed in the aforementioned Plueddemann patent to wet and cohesively bond to certain amorphous organic polymers to be due at least in part to the difference between the surface tension of the etherified polyols disclosed as solvents for these compositions and the surface energy of the polymer substrate. The present inventors observed the inability of these etherified polyols to thoroughly "wet" large areas of substrates formed from amorphous organic polymers such as polycarbonates, making it difficult to reproducibly apply to these substrates the thin. even coating of primer composition required to achieve good adhesion between the substrate and organosiloxane elastomers.

The present inventors found that while saturated aliphatic alcohols have a sufficiently low surface tension to form a coherent film when applied to amorphous organic polymers, addition of these alcohols to primer compositions containing the aforementioned silicone/organic copolymers results in formation of a solid precipitate. A variety of organic liquids were evaluated in an attempt to find those capable of dissolving the primer composition and wetting the surface of amorphous polymers such as polymethyl methacrylate and polycarbonates.

SUMMARY OF THE INVENTION

This invention is based on the discovery that ethylenically unsaturated aliphatic alcohols containing 4 5 or 6 carbon atoms are unique solvents for primer compositions comprising (1) at least one member of a specified group of ethylenically unsaturated organosilicon compounds containing silicon-bonded alkoxy groups, (2) silicone/organic copolymers prepared from esters of ethylenically unsaturated organic acids and organosilicon compounds derived from these acids, and (3) organohydrogensiloxane curing agents. Compositions containing these solvents form thin coherent films on amorphous organic polymers and reproducibly promote adhesion of organosiloxane elastomer compositions to these polymers.

DETAILED DESCRIPTION OF THE INVENTION

This invention provides a primer composition comprising

A. an organosilicon compound of the formula $(R^1O)_n(R^2O)_{(3-n)}SIR^3Si(OR^1)_r(OR^2)_{(3-r)}$, where $R^1$ represents $CH_2=CHR^4OR^5-$; $R^2$ represents an alkyl radical containing from 1 to 4 carbon atoms; $R^3$ represents an alkylene radical containing at least two carbon atoms. $R^4$ represents an alkylene radical; $R^5$ represents an alkylene or substituted alkylene radical where $R^5$ contains at least two carbon atoms and the substituent is a hydroxyl. alkoxy or $CH_2=CHR^4O-$ group, n is 1 or 2, and r is 0 or 1;

B. a copolymer derived from (1) at least one ester of an ethylenically unsaturated aliphatic carboxylic acid and (2) at least one silane of the formula $R^7COOR^6SiX_3$ where $R^6$ represents an alkylene radical, $R^7$ represents a terminally unsaturated alkenyl radical and X represents a hydrolyzable group;

C. an organohydrogensiloxane containing an average of at least two silicon-bonded hydrogen atoms per molecule; and D. an amount of solvent sufficient to dissolve said composition;

where the improvement comprises the presence in said solvent of at least 50 weight percent. based on the weight of said solvent, of an ethylenically unsaturated alcohol containing 4 5 or 6 carbon atoms or a mixture of said alcohols.

The Solvent

The novel feature of the present primer compositions is the solvent in which the other ingredients of the composition is dissolved. This solvent contains at least 50 percent by weight of an ethylenically unsaturated aliphatic alcohol containing 4, 5 or 6 carbon atoms or a mixture containing two or more of these alcohols. The hydroxyl group of the alcohol can be bonded to a primary, secondary or tertiary carbon atom, and the location of the ethylenic double bond in the molecule is not critical.

The choice of a particular ethylenically unsaturated alcohol is limited only by its availability and cost. so long as it contains from 4 to 6 carbon atoms. Suitable alcohols include but are not limited to primary alcohols such as 3-buten-1-ol, 2- buten-1-ol (crotyl alcohol), and 3-methyl-2-buten-1-ol, secondary alcohols such as 3-buten-2-ol, 1-penten-3-ol and 3-penten-2-ol, and tertiary alcohols such as 2-methyl-3-buten-2-ol and 3-methyl-1-penten-3-ol.

Surprisingly allyl alcohol, a primary ethylenically unsaturated alcohol containing 3 carbon atoms, will not dissolve all the ingredients of the present primer compositions. Acetylenic alcohols such as 3-methyl-2-butyn-3-ol yield cloudy solutions of the primer ingredients. The accompanying examples demonstrate that films formed from these compositions are oily and incapable of promoting cohesive bonding between a substrate to which the primer composition is applied and an organosiloxane elastomer.

To achieve the unique ability of the primer composition to form thin, coherent films on substrates formed from amorphous organic polymers such as polycarbonates and polymerized esters of methacrylic acid, the present ethylenically unsaturated alcohols containing from 4 to 6 carbon atoms should constitute at least about 50 percent by weight of the solvent. Any remaining solvents should be miscible with these unsaturated alcohols and not react with or precipitate any ingredients of the primer composition. When other solvents are present, these are preferably one or more of the aforementioned mono- and diethers of ethylene and propylene glycol.

A reduction in adhesion is also observed as the ethylenically unsaturated alcohol is gradually replaced with other solvents for the primer composition. such as the mono- and diethers derived from alkylene glycols such as ethylene and propylene glycols and saturated alcohols such as methanol and ethanol.

The ethylenically unsaturated alcohol or a mixture of two or more of these alcohols preferably constitutes at least 90 percent by weight of the entire solvent. which in turn constitutes from about 50 up to about 95 percent by weight of the primer composition.

The optimum solids content for a given primer composition is a function of several variables, including the thickness of the coating to be applied on the substrate and the method to be used to apply this coating. Typical application methods including brushing, wiping and spraying.

The present inventors discovered that the extent to which one of the improved primer compositions of this invention will promote adhesion between an organosiloxane elastomer and an amorphous polymer substrate is directly related to the number of carbon atoms present in the ethylenically unsaturated alcohol used as the solvent. It appears that the strength of the cohesive bond between the elastomer and the substrate is maximized when the alcohol contains 4 or 5 carbon atoms and decreases when the number of carbon atoms in the alcohol is increased to 6.

The individual ingredients of the primer composition will now be discussed in detail.

The Ethylenically Unsaturated Organosilicon Compound

The ethylenically unsaturated organosilicon compound, referred to hereinafter as ingredient A, is a bis-silylalkane containing at least 3 alkoxy groups and is represented by the general formula $$(R^1O)_n(R^2O)_{(3-n)}SiR^3Si(OR^1)_r(OR^2)_{(3-r)}.$$

The alkoxy groups represented by —$OR^2$ contain from 1 to 4 carbon atoms and are preferably methoxy or ethoxy. $R^1$ represents the residue remaining following removal of a hydroxyl group from a partially etherified aliphatic diol or triol. The etherified diol or triol represented by the formula $HOR^5OH$ contains at least two carbon atoms. At least one of the etherifying groups corresponds to the formula $CH_2$=$CHR^4O$—. $R^4$ represents an alkylene radical and $R^5$ represents an alkylene radical that is either unsubstituted when the etherified compound is a diol or is substituted with a second $CH_2$=$CHR^4O$— group, an alkoxy group or a hydroxyl group when the etherified compound is a triol.

Preferred terminally unsaturated etherifying groups represented by $CH_2$=$CHR^4O$— contain from 3 to 6 carbon atoms and include but are not limited to allyloxy and 3-butenoxy. Most preferably $R^4$ represents methylene and the etherifying group is allyl. Suitable diols and triols, represented by $HOR^5OH$, include but are not limited to ethylene glycol, the isomeric propanediols, 1,4-butanediol, glycerol, and 1,1,1,-trimethylolpropane.

Ingredient A can be prepared by reacting one or more of the aforementioned partially etherified aliphatic diols and/or triols with a bis-(trialkoxysilyl)alkane. The etherified diol or triol contanns at least one unreacted hydroxyl group and the molar ratio of total diol and/or triol to organosilicon compound in the reaction mixture is from 1 to about 3, depending upon the desired values for n and r in the foregoing formula. The reaction is conducted under conditions that are typical for condensation reactions involving alkoxysilanes and hydroxylated organic compounds. These conditions typically include an anhydrous atmosphere such as nitrogen, temperatures from ambient to 200° C. and a catalyst.

Useful catalysts for preparing ingredient A include but are not limited to organic amines, tin compounds and titanium compounds. Preferred catalysts include stannous octoate, dibutyltin dilaurate and titanium compounds such as tetrabutyl titanate. $Ti(OC_4H_9)_4$.

The catalyst must be at least partially soluble in the reaction mixture, and typically constitutes from about 0.1 to about 5 percent of the combined weight of all reactants.

When conducted under neutral or acidic conditions reactions involving replacement of silicon-bonded alkoxy groups generate the alcohol corresponding to the alkoxide group as a by-product. These reactions are often reversible, and it is therefore generally desirable to remove this by-product alcohol by distillation as the reaction progresses. The course of the reaction can then be readily followed by measuring the amount of alcohol collected. Because methanol and ethanol are the lowest boiling alcohols, the alkoxy groups of the present organosilicon reactants represented by $-OR^2$ in the foregoing formulae are preferably methoxy or ethoxy.

The mixture of reactants and catalyst is typically heated at a temperature of from about 50° to 200° C. for a period of time sufficient to achieve a substantially complete reaction, as indicated by the amount of byproduct alcohol collected. This time period is usually from 1 to about 5 hours.

If there is a likelihood that the ethylenically unsaturated organic compound(s) used to prepare ingredient A will polymerize at the temperatures used to react them with the organosilicon compound, it may be desirable to include in the reaction mixture an effective amount of a free radical scavenger such as hydroquinone to completely suppress or at least inhibit this polymerization.

Those embodiments of ingredient A having boiling points below about 200° C. under ambient or reduced pressure can be isolated by distilling the ingredient from the reaction mixture. Higher boiling products can be isolated using known chromatographic techniques with gases or liquids as the carrier.

If ingredient A is prepared in the absence of a solvent, the reaction mixture containing this ingredient can be combined with the other ingredients of the present primer compositions without isolation or purification.

In some instances it may be desirable to include in the reaction mixture used to prepare ingredient A a liquid diluent that may also function as a solvent for the reactants. Suitable diluents include aliphatic and aromatic hydrocarbons that are liquid at ambient temperature and boil within the range of from 50° to about 250° C. Representative diluents include hexane, heptane and liquid aromatic hydrocarbons such as benzene, toluene and xylene. It should be understood that at least a potion of these diluents may have to be removed before the reaction product is combined with the other ingredients of the primer composition.

The Silicone/Organic Copolymer

The present compositions also include a silicone/organic copolymer referred to hereinafter as ingredient B. This ingredient is required to achieve cohesive bonding between organosiloxane elastomers and amorphous or "glassy" polymers such as polymerized esters of acrylic or methacrylic acid, polycarbonates and polystyrene.

Ingredient B is prepared by reacting (1) at least one ester of an ethylenically unsaturated aliphatic carboxylic acid such as methacrylic or acrylic acid. and (2) a silane of the general formula $R^7COOR^6SiX_3$. In these formulae $R^6$ represents an alkylene radical, $R^7$ represents a terminally unsaturated alkenyl radical. and X represents a hydrolyzable group. Preferably $R^6$ contains from 1 to 4 carbon atoms and $R^7$ is $CH_2=CH-$ or $CH_2=C(CH_3)-$. Typical hydrolyzable groups represented by X include halogen atoms and lower alkoxy groups such as methoxy or ethoxy.

Copolymers corresponding to ingredient B of the present compositions are disclosed in U.S. Pat. No. 3,306,800 that issued to E. Plueddemann on Feb. 26, 1967 and is incorporated in its entirety herein by reference as a teaching of silicone/organic copolymers that are suitable for use in the primer compositions of this invention.

A particularly preferred class of copolymers is derived from methyl methacrylate and 3-methacryloxypropyltrimethoxysilane. The methyl methacrylate constitutes from 5 to about 95 weight percent of the monomer mixture, preferably from 80 to 95 weight percent.

The Organohydrogensiloxane

The present compositions include an organohydrogensiloxane as a crosslinking agent for ingredients A and B. Suitable organohydrogensiloxanes contain an average of at least three silicon-bonded hydrogen atoms per molecule. The crosslinking agent can be either a homopolymer or a copolymer containing organohydrogensiloxane, diorganosiloxane, and optionally mono- and/or triorganosiloxane units. The organic groups bonded to silicon are hydrocarbon radicals or substituted hydrocarbon radicals. To ensure compatibility between the organohydrogensiloxane and the other organosilicon ingredients of the primer composition it is preferable that the silicon-bonded hydrocarbon radicals in all of the organosilicon ingredients be selected from the same class, i.e. alkyl, substituted alkyl or aryl. In preferred embodiments of the present primer compositions all of these hydrocarbon radicals are identical. Most preferably they are all methyl.

The primer compositions of this invention are prepared by blending to homogeniety a mixture comprising one or more each of ingredients A and B, at least one of the aforementioned organohydrogensiloxane crosslinking agents. and a solvent containing at least 50 percent by weight of an ethylenically unsaturated primary, secondary or tertiary alcohol containing from 4 to 6 carbon atoms or a mixture containing two or more of these alcohols.

The improved primer compositions of this invention are particularly useful for bonding organosiloxane elastomers to amorphous organic polymers.

Organosiloxane compositions that cure by a variety of means at ambient temperature or by heating to yield elastomers are well known. Room temperature curable compositions are of three main types, namely one- and two-part compositions curable in the presence of moisture or oxygen and two-part compositions curable by a hydrosilation reaction in the presence of metals from the platinum group of the periodic table or compounds of these metals.

One-part moisture-curable polyorganosiloxane compositions contain a hydroxyl terminated polydiorganosiloxane with an average of 50 or more repeating units per molecule and a crosslinking agent that is usually a silane containing at least three silicon-bonded alkoxy or other hydrolyzable groups per molecule. A catalyst such as a compound of tin or titanium can be present to accelerate the curing reaction. Two-part moisture-curable compositions typically contain the same ingredients as one-part compositions, with the hydroxyl terminated polydiorganosiloxane and crosslinking agent in a first part, and a tin-containing catalyst in a second part, optionally in combination with additional polydiorganosiloxane. The first part of the two-part compositions also contains water to accelerate the curing reaction.

Two-part polyorganosiloxane compositions that when combined cure by a platinum-catalyzed hydrosilation reaction at room temperature typically contain a liquid or a solubilized solid polydiorganosiloxane having an average of at least two ethylenically unsaturated radicals such as vinyl per molecule, an organohydrogensiloxane containing at least three silicon-bonded hydrogen atoms per molecule as the curing agent and a relatively small concentration of platinum or a platinum compound as the curing catalyst.

Heat curable elastomer compositions suitable for use with the present primers contain the same ingredients a the aforementioned two part platinum-catalyzed polyorganosiloxane compositions that ordinarily cure at room temperature. The curing rate of these compositions under ambient conditions is substantially reduced by including one of the known platinum catalyst inhibitors. One such class of inhibitors are the acetylenic alcohols such as 2-methyl-3-butyn-2-ol. These inhibitors are inactivated or volatilized when the curable composition is heated, allowing rapid curing.

The curable organosiloxane elastomer composition can contain various additives and modifiers, including but not limited to reinforcing and non-reinforcing fillers, pigments and flame retardants. Organosiloxane compositions containing these optional additives are sufficiently described in the literature that a detailed discussion of these compositions in this specification is not required.

In a typical procedure for preparing laminates useful as windows and windshields, one of the present primer compositions is applied as a thin continuous film to one surface of two substantially planar, optically clear amorphous organic polymer substrates, such as sheets formed from a polycarbonate, and allowed to dry under ambient conditions. A layer of an optically clear, curable organosiloxane elastomer composition is then placed in contact with the primer layer on one of the substrates. The primed surface of the second substrate is then placed in contact with the curable elastomer and the resultant composite is heated to cure the elastomer. To promote cohesive bonding between the various layers of the laminate, curing of the elastomer is preferably conducted while the laminate is under pressure in a hydraulic press or other suitable device. The cure temperature for the elastomer is typically from 100° to about 200° C.

The following examples describe preferred embodiments of the present primer compositions and should not be interpreted as limiting the scope of the invention as described in the accompanying claims. Unless otherwise indicated in the examples all parts and percentages are by weight.

EXAMPLE 1

Preparation of Primer Compositions

Primer compositions were prepared by blending the following ingredients to homogeniety.

2 parts of the product obtained by reacting equimolar amounts of 1,2-bis(trimethoxysilyl)ethane and the diallyl ether of trimethylolpropane in the presence of 1% by weight of tetrabutyl titanate, (ingredient A);

10 parts of a 20 percent by weight solution in ethyl acetate of a methyl methacrylate/3-methacryloxypropyltrimethoxysilane copolymer, (ingredient B);

1 part of a trimethylsiloxy endblocked polymethylhydrogensiloxane exhibiting a viscosity of 0.13 Pa.s, (ingredient C); and 87 parts of one of the solvents (ingredient D) listed in Table 1.

Ingredient A was prepared by heating the mixture of the reactants and catalyst to the boiling point with stirring. The methanol produced as a by-product of the reaction was continuously removed from the reaction mixture by distillation and collected. Heating of the reaction mixture was continued until the amount of alcohol equivalent to a substantially complete reaction had been collected. The final temperature of the reaction mixture was 160° C.

Ingredient B was prepared by reacting methyl methacrylate and 3-methacryloxypropyltrimethoxysilane in a molar ratio of 10:1, respectively, in the presence of 1 percent, based on total monomers, of 3-mercaptopropyltrimethoxysilane and a catalytic amount of benzoyl peroxide using ethyl acetate as the polymerization medium.

Preparation of Test Samples

Laminates were prepared by spraying one of the solutions identified in the following Table 1 on to one surface of a sheet of optically clear polycarbonate available as Tuffak A (R) from the Rohm and Haas Company. The dimensions of the sheet were 3.8×15.2×0.6 cm. Prior to being sprayed the polycarbonate sheets were immersed in hexane while being washed using a piece of cheese cloth. After being wiped dry the sheets were washed with methanol and then wiped dry. The primer composition was applied using a spray gun adjusted for a vertical fan pattern. The thickness of the primer layer was about 2000 angstroms.

At this time the condition of the resultant liquid film was noted and is recorded in Table 2. Specifically, it was noted whether the film was continuous and coherent and whether it contained surface imperfections in the form of discontinuities typically referred to by those skilled in the art as "orange peel" and "fish eyes". Both of these imperfections are believed due to the inability of a coating composition to uniformly "wet" the surface of a substrate.

The primer layer was dried by exposing it ambient conditions for one hour. A group of five samples were then placed primed side up on a metal plate that had been covered with a sheet of polytetrafluoroethylene. A 3 cm-wide strip of polytetrafluoroethylene was placed across one end of each sample to create an adhesion-free area. A 1.3 mm-thick calendered film of optically clear curable elastomer was then placed over all of the samples, followed by a sheet of stainless steel 30 mesh screening. The screening had been previously washed with toluene, rinsed with acetone, dried and finally wiped with a piece of cheesecloth that had been saturated with the primer composition described in the preceding section of this example. The solvent for the composition was 2-methyl-3-buten-2-ol. After drying for one hour under ambient conditions the sheet of primed screening was placed on the elastomer film so as to cover all of the primed substrates.

The screening was then covered with a calendered elastomer film identical in composition to the one previously applied over the substrate, followed by a second sheet of polytetrafluoroethylene and a second metal plate. The samples were cured by placing the resultant composite in a hydraulic press and heating it for 2 hours at a temperature of 100° C. under a pressure of 200 psig (1.4 MPa). After cooling the cured substrates were separated from one another. Prior to being evaluated a 6 mm-wide strip of screening and calendered film was trimmed from each of the two 15.2 cm-long sides of each sample to leave a 2.5 cm-wide strip of laminate adhered to the substrate.

Both calendered films of optically clear elastomer composition were identical in composition and curable by a platinum-catalyzed hydrosilation reaction. The elastomer contained 35 percent by weight of a silica filler described in U.S. Pat. No. 4,344,800, which issued to M. Lutz on Aug. 17, 1982.

The degree to which the cured elastomer adhered to the polycarbonate substrate was evaluated by subjecting the cured samples to an adhesion test similar to that described in ASTM Test Procedure No. D-903. The procedure was modified by exerting the peeling force at an angle of 90 degrees with respect to the plane of the substrate, rather than at an angle of 180 degrees as described in the ASTM test procedure.

The percent cohesive failure was determined by estimating the percentage of originally primed substrate surface containing cured elastomer adhering to it. The force required to peel the elastomer from the substrate was measured using a load cell associated with the device used to exert the force required to peel the elastomer layer from the substrate. These force values are recorded in Table 2.

Samples prepared using an ethylenically unsaturated alcohol of this invention are referred to by numbers as follows:

TABLE 1

| Alcohol | Sample |
|---|---|
| crotyl alcohol (2-buten-1-ol) | 1 |
| 2-methyl-3-buten-2-ol | 2 |
| 3-methyl-1-pentene-3-ol | 3 |

For purposes of comparison a primer sample was prepared using as the solvent 87 parts of an acetylenic alcohol, 2-methyl-3-butyn-2-ol, in place of an alcohol of this invention. This sample is identified as A in Table 2.

TABLE 2

| Sample | Peel Strength (Kg.) | % Cohesive Failure | Appearance of Primed Surface |
|---|---|---|---|
| 1 | 27 | 100 | Continuous film Some "orange peel" |
| 2 | 27 | 100 | Continuous film, No defects |
| 3 | 4 | 50 | Continuous film, Some "orange peel" |
| A | 1 | 0 | Continuous, oily |

Primer composition A was cloudy in comparison to compositions 1-3, which were optically clear.

These data demonstrate that primer compositions 1-3 all promoted adhesion between the elastomer and the polycarbonate, as shown by at least partial cohesive failure, i.e. rupturing of the elastomer layer. Primer compositions containing ethylenically unsaturated alcohols having 4 or 5 carbon atoms were preferred, as evidenced by the 100% cohesive failure obtained using these primer compositions.

EXAMPLE 2

This example demonstrates that an ethylenically unsaturated alcohol containing 5 carbon atoms can be used in combination with other known solvents for the present primer compositions.

Test samples were prepared following a modification of the procedure described in the preceding Example 1. The modification consisted of placing individual strips of stainless steel screening measuring 3.8 by 22.9 cm over each of the substrates in place of the sheets used in Example 1 and coating the screens with a primer available as SS4120 from the Silicone Products Division of the General Electric Company.

The primer compositions evaluated contained the same ingredients as those reported in the preceding Example 1 with the following solvents:

A 1:1 weight ratio mixture of 2-methyl-3-buten-2-ol and the monomethyl ether of propylene glycol (sample 4)

A mixture containing 1 part by weight of 2-methyl-3-buten-2-ol and 2 parts by weight of the monomethyl ether of propylene glycol (sample B). This is outside the scope of the present invention.

The results of the evaluation of these samples are recorded in Table 3.

TABLE 3

| Sample | Peel Strength (Kg.) | % Cohesive Failure Surface | Appearance of Primed |
|---|---|---|---|
| 4 | 11 | 60 | Continuous film, slight "orange peel" |
| B | 4 | Spotty* | Discontinuous film, considerably more "orange peel" than Sample 4 |

*The elastomer adhered to the substrate in scattered areas equivalent to about 30% of the total surface area of the substrate.

EXAMPLE 3

The following solvents are outside the scope of this invention and were evaluated for comparative purposes by adding them to the other ingredients (A-C) of the primer composition described in Example 1. In all instances a white precipitate formed when the solvent was added, indicating that at least one of the ingredients of the primer composition was insoluble in the solvent being evaluated.

| Solvent |
|---|
| Methanol |
| n-Octanol |
| iso-Propanol |
| t-Butanol |
| Allyl alcohol |
| Hexane |
| Heptane |

That which is claimed is:

1. In a primer composition comprising
A. an organosilicon compound of the formula $(R^1O)_n(R^2O)_{(3-n)}SiR^3Si(OR^1)_r(OR^2)_{(3-r)}$, where $R^1$ represents $CH_2\!\!=\!\!CHR^4OR^5\!\!-\!\!$; $R^2$ represents an alkyl radical containing from 1 to 4 carbon atoms; $R^3$ represents an alkylene radical containing at least 2 carbon atoms; $R^4$ represents an alkylene radical; $R^5$ represents an alkylene or substituted alkylene radical, where $R^5$ contains at least two carbon atoms and the substituent is a hydroxy, alkoxy or $CH_2=CHR^4O-$ group, n is 1 or 2, and n is 0 or 1;

B. a copolymer derived from (1) at least one ester of an ethylenically unsaturated aliphatic carboxylic acid and (2) at least one silane of the formula $R^7COOR^6SiX_3$ where $R^6$ represents an alkylene radical, $R^7$ represents a terminally unsaturated alkenyl radical and X represents a hydrolyzable group;

C. an organohydrogensiloxane containing an average of at least two silicon-bonded hydrogen atoms per molecule; and D. an amount of solvent sufficient to dissolve said composition;

the improvement comprising the presence in said solvent of at least 50 weight percent, based on the weight of said solvent, of an ethylenically unsaturated alcohol containing 4, 5 or 6 carbon atoms or a mixture of said alcohols.

2. A composition according to claim 1 where, in ingredients A, $R^2$ is methylene, $R^3$ is ethylene, $R^4$ is methylene, $R^5$ is ethylene, propylene 1,4-butylene or

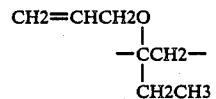

in ingredient B, $R^6$ is propylene, $R^7$ is $CH_2=CH$ or $CH_2=C(CH_3)-$, X is methoxy or ethoxy, and said ester of an ethylenically unsaturated carboxylic acid is methyl methacrylate and, the organohydrogensiloxane (ingredient C) is a polymethylhydrogensiloxane.

3. A composition according to claim 2 where, in ingredient D, the alcohol is crotyl alcohol, 2-methyl-2-buten-2-ol or 3-methyl-1- penten-3-ol.

4. A composition according to claim 2 where, in ingredient D, the ethylenically unsaturated alcohol contains 4 or 5 carbon atoms.

5. A composition according to claim 1 where said solvent (ingredient D) consists essentially of said alcohol and up to 50 percent, based on the weight of said solvent, of a monoether or diether of ethylene or propylene glycol.

* * * * *